United States Patent
Takeda et al.

(10) Patent No.: US 9,853,304 B2
(45) Date of Patent: Dec. 26, 2017

(54) FUEL CELL SYSTEM AND CONTROL METHOD FOR THE SAME

(71) Applicant: NISSAN MOTOR CO., LTD., Yokohama-shi, Kanagawa (JP)

(72) Inventors: Hiroshi Takeda, Yokohama (JP); Yoshitomo Asai, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 165 days.

(21) Appl. No.: 14/655,895

(22) PCT Filed: Nov. 26, 2013

(86) PCT No.: PCT/JP2013/081719
§ 371 (c)(1),
(2) Date: Jun. 26, 2015

(87) PCT Pub. No.: WO2014/103589
PCT Pub. Date: Jul. 3, 2014

(65) Prior Publication Data
US 2015/0349358 A1     Dec. 3, 2015

(30) Foreign Application Priority Data
Dec. 28, 2012   (JP) .................................. 2012-287516

(51) Int. Cl.
*H01M 8/04*     (2016.01)
*H01M 8/04089*  (2016.01)
(Continued)

(52) U.S. Cl.
CPC ... *H01M 8/04104* (2013.01); *H01M 8/04089* (2013.01); *H01M 8/04201* (2013.01);
(Continued)

(58) Field of Classification Search
None
See application file for complete search history.

(56) References Cited

U.S. PATENT DOCUMENTS

| | | | |
|---|---|---|---|
| 7,691,518 B2 | 4/2010 | Matsuoka | |
| 8,492,037 B2 | 7/2013 | Kaito | |
| 2006/0222924 A1 | 10/2006 | Matsuoka | |
| 2009/0191432 A1* | 7/2009 | Logan ............... | H01M 8/04141 429/413 |
| 2009/0241570 A1 | 10/2009 | Kuribayashi et al. | |
| 2009/0258257 A1 | 10/2009 | Kaito | |
| 2010/0035106 A1* | 2/2010 | Osada ............... | H01M 8/04089 429/515 |

(Continued)

FOREIGN PATENT DOCUMENTS

| | | |
|---|---|---|
| JP | 2006-172935 A | 6/2006 |
| JP | 2006-526271 A | 11/2006 |

(Continued)

*Primary Examiner* — Daniel Gatewood
(74) *Attorney, Agent, or Firm* — Foley & Lardner LLP

(57) ABSTRACT

A fuel cell system includes a fuel cell, an air supplier, an air passage connected to the fuel cell, air supplied from the air supplier flowing in the air passage, a bleed passage branched off from the air passage on a side upstream of the fuel cell and joining the air passage on a side downstream of the fuel cell, part of the air supplied by the air supplier flowing in the bleed passage in such a manner as to circumvent the fuel cell, a bleed valve provided in the bleed passage, the bleed valve regulating the amount of air flowing in the bleed passage, an air supplier control unit which controls the air supplier to supply a predetermined amount of air, a wetness reduction determination unit which determines whether or not it is necessary to reduce a degree of wetness of the fuel cell, and a bleed amount control unit which reduces an opening of the bleed valve when the degree of wetness of the fuel cell needs to be reduced.

12 Claims, 10 Drawing Sheets

(51) Int. Cl.
*H01M 8/04291* (2016.01)
*H01M 8/04828* (2016.01)
*H01M 8/04492* (2016.01)
*H01M 8/04746* (2016.01)
*H01M 8/04082* (2016.01)
*H01M 8/04537* (2016.01)
*H01M 8/04701* (2016.01)
*H01M 8/1018* (2016.01)

(52) U.S. Cl.
CPC ... *H01M 8/04291* (2013.01); *H01M 8/04492* (2013.01); *H01M 8/04649* (2013.01); *H01M 8/04723* (2013.01); *H01M 8/04753* (2013.01); *H01M 8/04776* (2013.01); *H01M 8/04828* (2013.01); *H01M 2008/1095* (2013.01); *H01M 2250/20* (2013.01); *Y02T 90/32* (2013.01)

(56) References Cited

U.S. PATENT DOCUMENTS

2011/0076584 A1\* 3/2011 Katano ............... B60L 11/1881
429/444

FOREIGN PATENT DOCUMENTS

| JP | 2007-257956 A | 10/2007 |
|----|---------------|---------|
| JP | 2008-041625 A | 2/2008 |
| JP | 2009-048816 A | 3/2009 |
| JP | 2009-235982 A | 10/2009 |
| JP | 2010-114039 A | 5/2010 |
| JP | 2012-252939 A | 12/2012 |
| JP | 2013-038086 A | 2/2013 |

\* cited by examiner

FUEL CELL SYSTEM AND CONTROL METHOD FOR THE SAME

TECHNICAL FIELD

The present invention relates to a fuel cell system and a control method for the same.

BACKGROUND ART

JP2010-114039A discloses a system which includes a bleed passage branched off from an air passage upstream of a fuel cell and joining an air passage downstream of the fuel cell and which bleeds a part of air supplied from an air compressor. In this system, a rotation speed of the air compressor is reduced when the air flowing into the fuel cell is reduced in amount. However, since the rotation speed of the air compressor is not suddenly reduced, excessive drying of the fuel cell is prevented by allowing excess air to escape to the bleed passage.

SUMMARY OF INVENTION

A fuel cell generates power by maintaining an electrolyte membrane in a suitable wet state and having reaction gas (cathode gas $O_2$, anode gas $H_2$) supplied. If a degree of wetness of the electrolyte membrane is excessive, it is desired to reduce the degree of wetness by active drying. However, JP2010-114039A aims to prevent excessive drying of the fuel cell, i.e. prevent the fuel cell from being dried. Further, in regulating the rotation speed of the air compressor, operation noise of the air compressor varies, which may be on the ears of a passenger to cause a sense of discomfort.

The present invention was developed in view of such a problem. An object of the present invention is to provide a fuel cell system capable of reducing a degree of wetness of a fuel cell without causing a sense of discomfort to a passenger.

A fuel cell system according to one aspect of the present invention includes a fuel cell, an air supplier, an air passage configured to be connected to the fuel cell, air supplied from the air supplier flowing in the air passage, a bleed passage configured to be branched off from the air passage on a side upstream of the fuel cell and join the air passage on a side downstream of the fuel cell, part of the air supplied by the air supplier flowing in the bleed passage in such a manner as to circumvent the fuel cell and a bleed valve configured to be provided in the bleed passage, the bleed valve regulating the amount of air flowing in the bleed passage. The fuel cell system further includes an air supplier control unit configured to control the air supplier to supply a predetermined amount of air, a wetness reduction determination unit configured to determine whether or not it is necessary to reduce a degree of wetness of the fuel cell, and a bleed amount control unit configured to reduce an opening of the bleed valve when the degree of wetness of the fuel cell needs to be reduced.

DESCRIPTION OF EMBODIMENTS

Hereinafter, embodiments of the present invention are described with reference to the accompanying drawings.

First Embodiment

Figure 1:
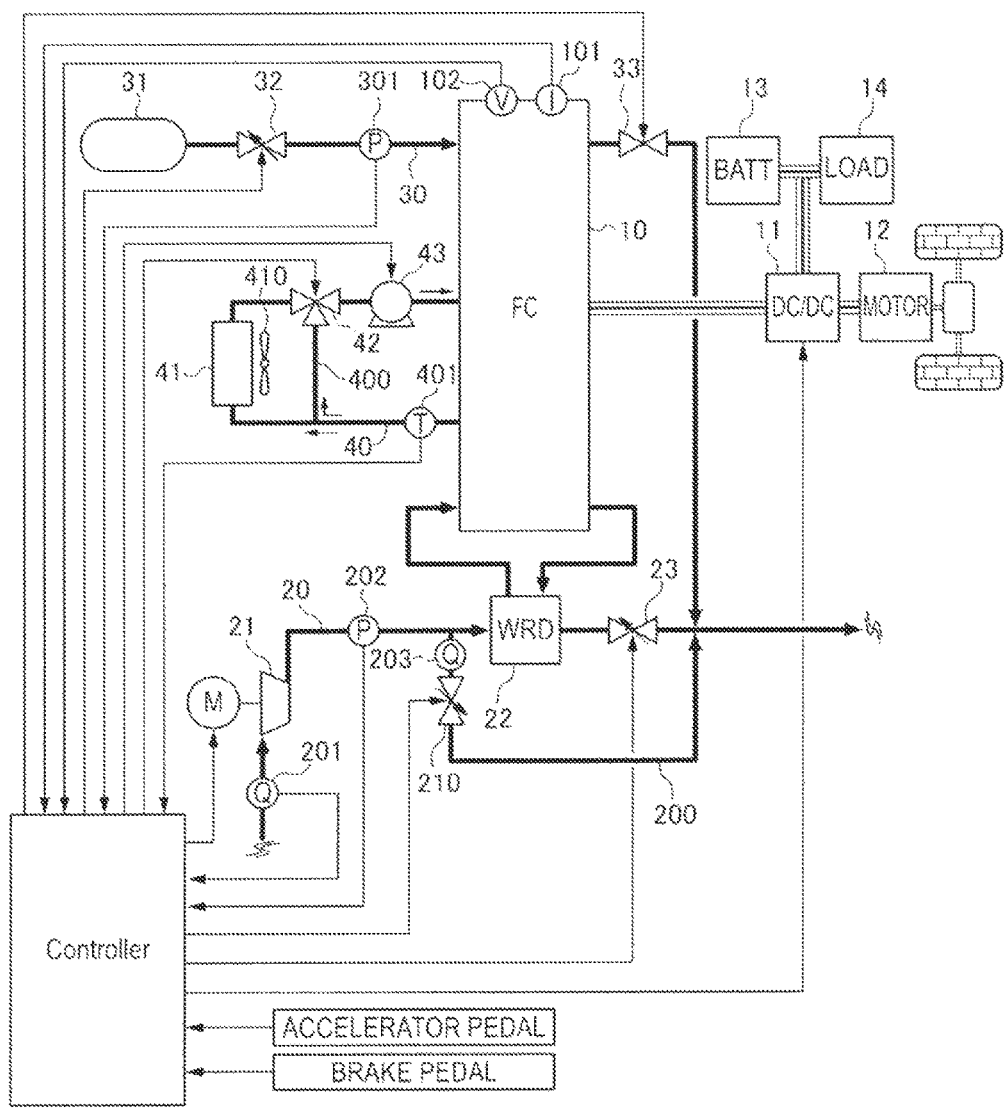
FIG. 1 is a diagram showing a basic configuration of a fuel cell system according to the present invention.

FIG. 1 is a diagram showing a basic configuration of a fuel cell system according to the present invention.

First, with reference to FIG. 1, the basic configuration of the fuel cell system according to the present invention is described.

A fuel cell stack 10 generates power by having reaction gas (cathode gas $O_2$, anode gas $H_2$) supplied while an electrolyte membrane is maintained in a suitable wet state. To do so, a cathode line 20, an anode line 30 and a cooling water circulation line 40 are connected to the fuel cell stack 10. It should be noted that a power generation current of the fuel cell stack 10 is detected by a current sensor 101. A power generation voltage of the fuel cell stack 10 is detected by a voltage sensor 103.

The cathode gas $O_2$ to be supplied to the fuel, cell stack 10 flows in the cathode line 20. A compressor 21, a WRD (Water Recovery Device) 22 and a cathode pressure regulating valve 23 are provided in the cathode line 20. Further, a bleed line 200 is provided in parallel to the cathode line 20. The bleed line 200 is branched off on a side downstream of the compressor 21 and upstream of the WRD 22 and joins on a side downstream of the cathode pressure regulating valve 23. Because of such a configuration, a part of air blown by the compressor 21 flows in the bleed line 200 to circumvent the fuel cell stack 10. A bleed valve 210 is provided in the bleed line 200.

The compressor 21 is, for example, a centrifugal turbo compressor in the present embodiment. The compressor 21 is arranged on a side of the cathode line 20 upstream of the fuel cell stack 10 and the WRD 22. The compressor 21 is driven by a motor M. The compressor 21 regulates a flow rate of the cathode gas $O_2$ flowing in the cathode line 20. The flow rate of the cathode gas $O_2$ is regulated by a rotation speed of the compressor 21.

The WRD 22 humidifies air to be introduced into the fuel cell stack 10. The WRD 22 includes a humidified unit in which gas to be humidified flows and a humidifying unit in which water-containing gas as a humidifying source flows. Air introduced by the compressor 21 flows in the humidified unit. Gas containing water after passing through the fuel cell stack 10 flows in the humidifying unit.

The cathode pressure regulating valve 23 is provided on a side of the cathode line 20 downstream of the fuel cell stack 10. The cathode pressure regulating valve 23 regulates a pressure of the cathode gas $O_2$ flowing in the cathode line 20. The pressure of the cathode gas $O_2$ is regulated by an opening of the cathode pressure regulating valve 23.

A flow rate of the cathode gas $O_2$ flowing in the cathode line 20 is detected by a compressor flow rate sensor 201. This compressor flow rate sensor 201 is provided on a side of the cathode line 20 upstream of the compressor 21. It should be noted that a filter for removing foreign substances in the cathode gas $O_2$ may be provided at an opening end of the cathode line 20 and the compressor flow rate sensor 201 may be provided between the filter and the compressor 21.

The pressure of the cathode gas $O_2$ flowing in the cathode line 20 is detected by a cathode pressure sensor 202. This cathode pressure sensor 202 is provided downstream of the compressor 21 and upstream of the WRD 22. Further, in FIG. 1, the cathode pressure sensor 202 is located downstream of the compressor flow rate sensor 201.

The bleed valve 210 is provided in the bleed line 200. The bleed valve 210 regulates a flow rate of the cathode gas $O_2$ flowing in the bleed line 200. The flow rate of the cathode gas $O_2$ is regulated by an opening of the bleed valve 210. The flow rate of the cathode gas $O_2$ flowing in the bleed line 200 is detected by a bleed flow rate sensor 203.

The anode gas $H_2$ to be supplied to the fuel cell stack 10 flows in the anode line 30. A cylinder 31, an anode pressure regulating valve 32 and a purge valve 33 are provided in the anode line 30.

The anode gas $H_2$ is stored in a high-pressure state in the cylinder 31. The cylinder 31 is provided on a most upstream side of the anode line 30.

The anode pressure regulating valve 32 is provided downstream of the cylinder 31. The anode pressure regulating valve 32 regulates a pressure of the anode gas $H_2$ newly supplied to the anode line 30 from the cylinder 31. The pressure of the anode gas $H_2$ is regulated by an opening of the anode pressure regulating valve 32.

The purge valve 33 is provided downstream of the fuel cell stack 10. When the purge valve 33 is opened, the anode gas $H_2$ is purged.

The pressure of the anode gas $H_2$ flowing in the anode line 30 is detected by an anode pressure sensor 301. This anode pressure sensor 301 is provided downstream of the anode pressure regulating valve 32 and upstream of the fuel cell stack 10.

Cooling water to be supplied to the fuel cell stack 10 flows in the cooling water circulation line 40. A radiator 41, a three-way valve 42 and a water pump 43 are provided in the cooling water circulation line 40. Further, a bypass line 400 is provided in parallel to the cooling water circulation line 40. The bypass line 400 is branched off on a side upstream of the radiator 41 and joins on a side downstream of the radiator 41. Thus, the cooling water flowing in the bypass line 400 bypasses the radiator 41.

The radiator 41 cools the cooling water. A cooling fan 410 is provided for the radiator 41.

The three-way valve 42 is located at a joint part of the bypass line 400. The three-way valve 42 regulates a flow rate of the cooling water flowing in the line on the radiator side and a flow rate of the cooling water flowing in the bypass line according to an opening thereof. In this way, the temperature of the cooling water is regulated.

The water pump 43 is located downstream of the three-way valve 42. The water pump 43 feeds the cooling water having flowed through the three-way valve 42 to the fuel cell stack 10.

The temperature of the cooling water flowing in the cooling water circulation line 40 is detected by a water temperature sensor 401. This water temperature sensor 401 is provided upstream of a branched part of the bypass line 400.

A controller receives signals of the current sensor 101, the voltage sensor 102, the compressor flow rate sensor 201, the cathode pressure sensor 202, the anode pressure sensor 301 and the water temperature sensor 401. Then, the controller outputs signals to control the operations of the compressor 21, the cathode pressure regulating valve 23, the bleed valve 210, the anode pressure regulating valve 32, the purge valve 33, the three-way valve 42 and the water pump 43.

By such a configuration, the fuel cell stack 10 is maintained at a suitable temperature, whereby the electrolyte membrane is maintained in a suitable wet state, and generates power by having the reaction gas (cathode gas $O_2$, anode gas $H_2$) supplied. Power generated by the fuel cell stack 10 is supplied to a travel motor 12, a battery 13 and a load 14 via, a DC/DC convener 11.

Power generation efficiency of the fuel cell stack 10 is poor if the wet state is too much (i.e. excessively wet) or too little (i.e. excessively dry). If the rotation speed of the compressor 21 is regulated to avoid such a state, operation noise of the compressor 21 varies, which may be harsh on the ears of a passenger and cause a sense of discomfort.

Accordingly, in the present embodiment, the wet state of the fuel cell stack 10 is regulated while the rotation speed of the compressor 21 is prevented from varying.

A specific technique is described below.

Figure 2:
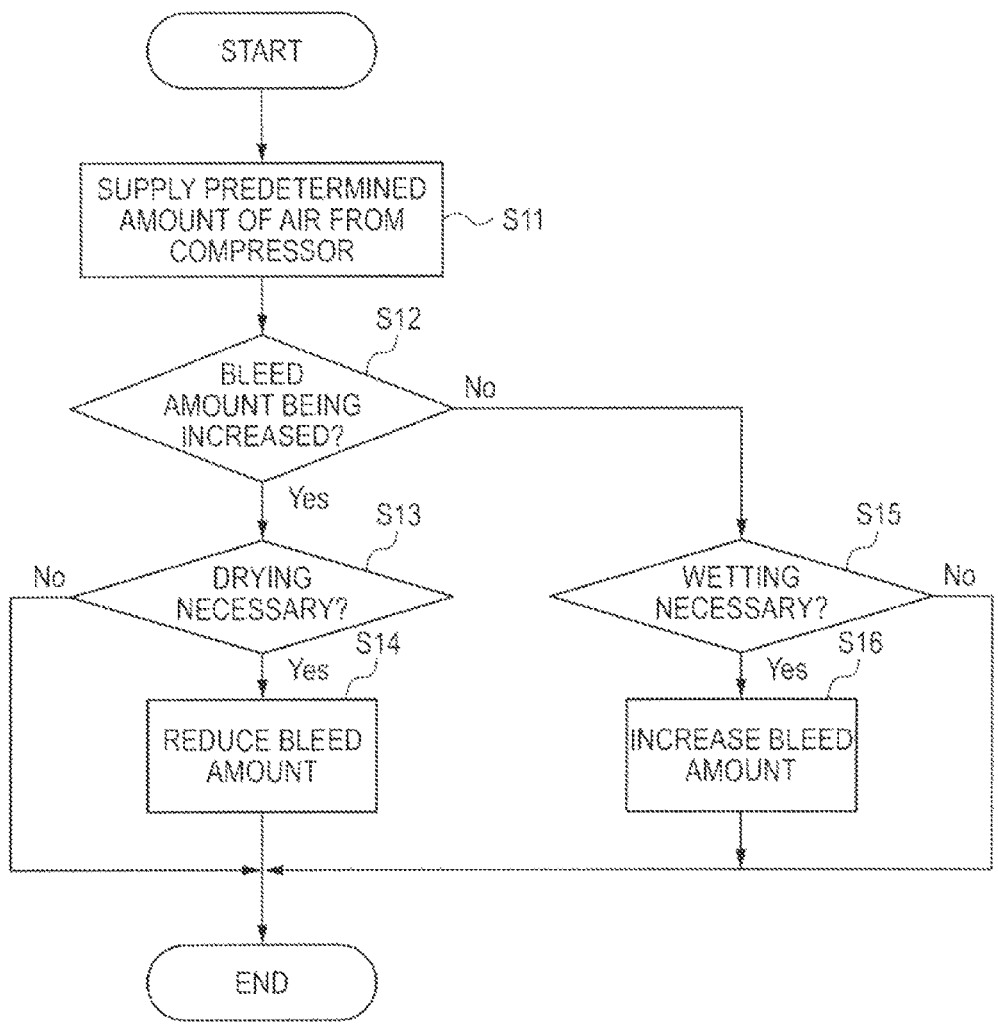
FIG. 2 is a control flow chart executed by a controller of a fuel cell system according to a first embodiment.

FIG. 2 is a control flow chart executed by a controller of a fuel cell system according to a first embodiment. It should be noted that the controller repeatedly executes this flow chart every very short time (e.g. 10 milliseconds).

In Step S11, the controller controls the compressor 21 to supply a predetermined amount of air.

In Step S12, the controller determines whether or not a bleed amount is increasing. The controller shifts a process to Step S13 if the determination result is affirmative while shifting the process to Step S15 if the determination result is negative.

In Step S13, the controller determines whether or not it is necessary to dry the fuel cell stack 10. Specifically, it is determined to be necessary to dry the fuel cell stack 10, for example, when a high-frequency impedance is smaller than a reference value (a predetermined value). An impedance is correlated with the degree of wetness of the electrolyte membrane. The larger the degree of wetness of the electrolyte membrane (i.e. the wetter the electrolyte membrane), the smaller the impedance. Accordingly, whether or not it is necessary to dry the fuel cell stack 10 can be determined based on the high-frequency impedance. It should be noted that the reference value may be set in advance through an experience. Further, a little more of the reaction gas (cathode gas $O_2$, anode gas $H_2$) is supplied and water is easily generated during a startup operation (including a subzero startup operation and a return operation from an idle stop state) and during a warm-up operation. However, during such operations, the temperature of the fuel cell stack 10 varies. Since the impedance is easily affected by temperature, it may not be possible to make correct judgment based on the impedance when, temperature varies. Accordingly, during such operations, it may be determined to be necessary to dry the fuel cell, stack 10 until a reference time (a predetermined time) elapses. The reference time in this case may also be set in advance through an experience. By doing so, a timing of drying can be correctly determined. The controller shifts the process to Step S14 if the determination result is affirmative while exiting the process if the determination result is negative.

In Step S14, the controller reduces the bleed amount by reducing the opening of the bleed valve 210. It should be noted that a specific method for setting the bleed amount is described later.

In Step S15, the controller determines whether or not it is necessary to wet the fuel cell stack 10. Specifically, it is determined to be necessary to wet the fuel cell stack 10, for example, when the high-frequency impedance is larger than a reference value (a predetermined value). Further, it may be determined to be necessary to wet the fuel cell stack 10 upon the elapse of a time longer than a reference time (a predetermined time) from a startup operation (including a subzero startup operation and a return operation from an idle stop state) or a warm-up operation. These reference value and reference time may be set in advance through an experience. By doing so, a timing of wetting can be correctly determined. The controller shifts the process to Step S16 if the determination result is affirmative while exiting the process if the determination result is negative.

In Step S16, the controller increases the bleed amount by increasing the opening of the bleed valve 210. It should be noted that the specific method for setting the bleed amount is described later.

Figure 3:
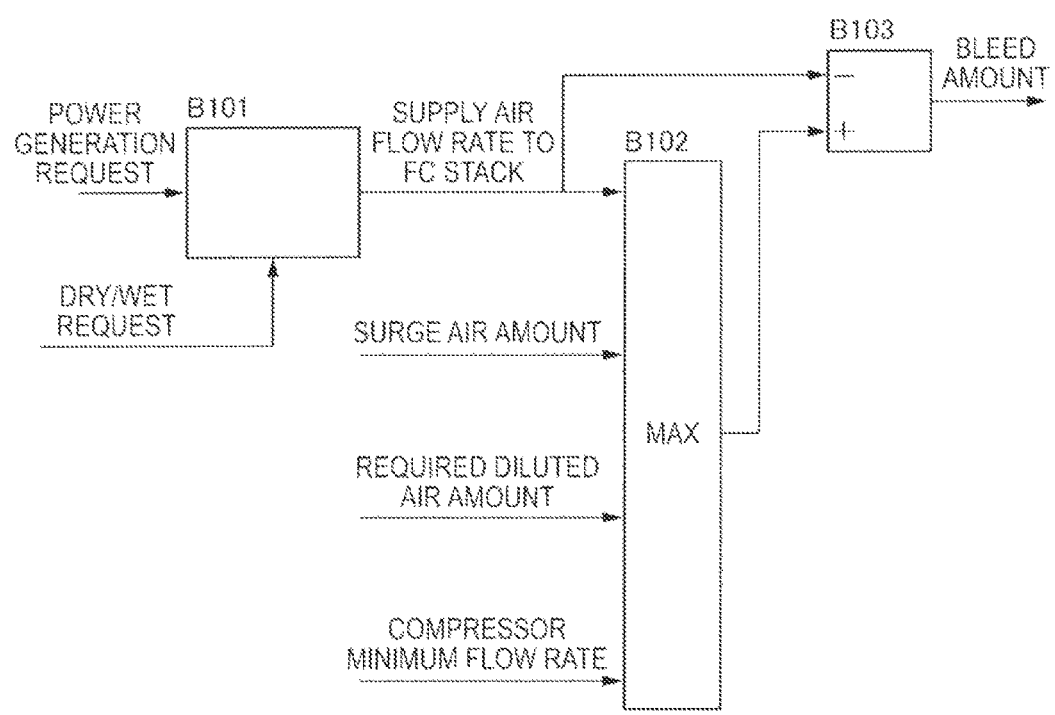
FIG. 3 is a block diagram showing a function of calculating a bleed amount.

FIG. 3 is a block diagram showing a function of calculating the bleed amount.

It should, be noted that each of the following blocks shown in the block diagram is a virtual unit showing each function of the controller and each block does not mean physical presence.

Figure 4:
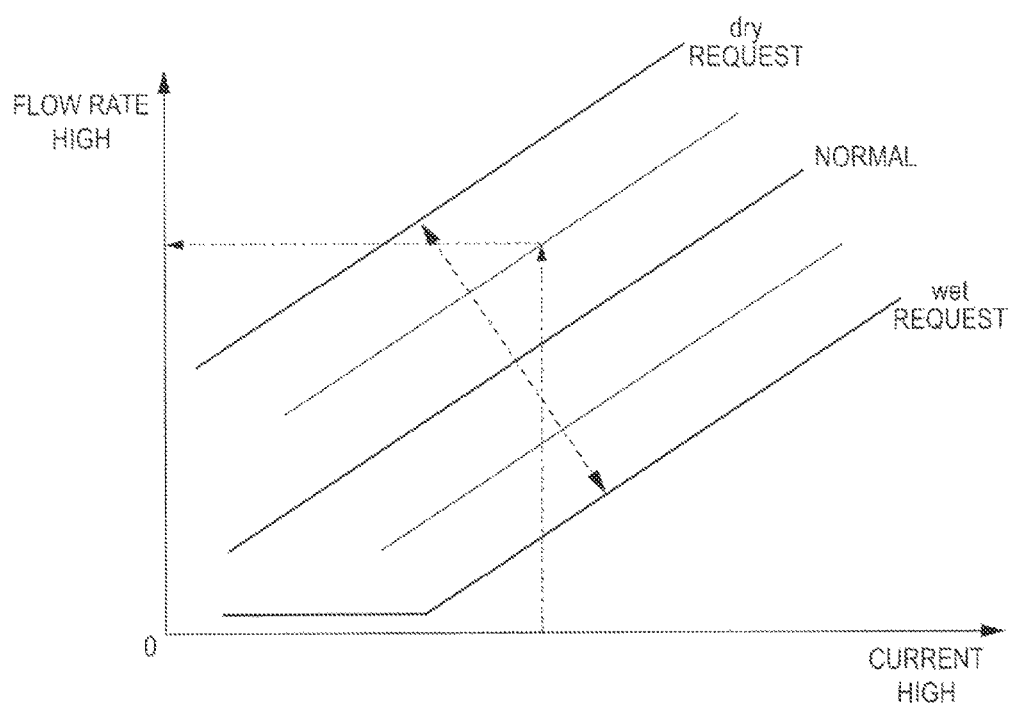
FIG. 4 is a graph showing an example of a map for calculating the amount of air to be supplied to a fuel cell stack in response to a power generation request and a dry/wet request.

A block B101 calculates the amount of air to be supplied to the fuel cell stack 10 on the basis of a power generation request and a dry/wet request. Specifically, the amount of air is obtained by applying the power generation request and the dry/wet request to a map shown in FIG. 4.

A block B102 outputs a maximum value out of the air amount calculated in the block B101, a surge air amount, a required diluted air amount and a compressor minimum air amount.

The compressor 21 may surge if a supply flow rate becomes excessively small. The surge air amount is a minimum flow rate of the compressor 21 to prevent the occurrence of such a situation. Further, the purge valve 33 is opened to purge the anode gas $H_2$. The amount of air necessary to sufficiently dilute this purged anode gas $H_2$ is the required diluted air amount. Further, the compressor minimum flow rate is a minimum flow rate determined from the specifications of the compressor 21 (motor M) and the like.

A block B103 calculates a bleed air amount by subtracting the air amount calculated in the block B101 on the basis of the air amount output from the block B102. By subtracting the amount of air to be supplied to the fuel cell stack 10 from the amount of air supplied by the compressor 21 in this way, the amount of excess air to be bled is calculated.

Figure 5:
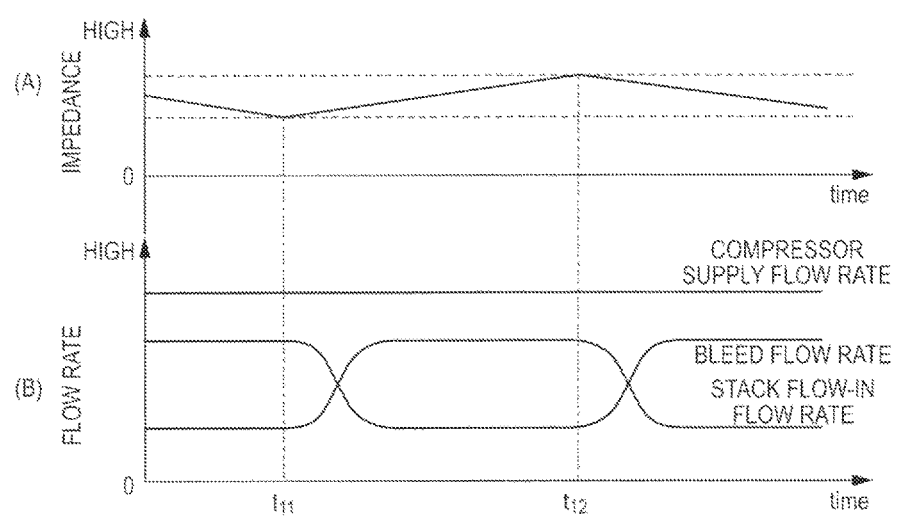
FIG. 5 is a time chart showing an operation when the control flow chart according to the first embodiment is executed.

FIG. 5 is a time chart showing an operation, when the control flow chart according to the first embodiment is executed.

At time 0, the bleed amount is being increased (FIG. 5(B)). This causes a flow-in amount to the fuel cell stack to be reduced (FIG. 5(B)), whereby the degree of wetness of the fuel cell is increased and the impedance is decreased (FIG. 5(A)). In this state, Steps S11→S12→S13 are repeatedly performed.

When the impedance fails below the reference value at time t11 (FIG. 5(A)), Steps S11→S12→S13→14 are performed. This causes the bleed amount to be reduced (FIG. 5(B)). In the next and subsequent cycles, Steps S12→S15 are performed. This causes the flow-in amount to the fuel cell stack to be increased (FIG. 5(B)), the degree of wetness of the fuel cell to decrease and the impedance to increase (FIG. 5(A)).

When the impedance rises above the reference value at time t12, Steps S11→S12→S15→S16 are performed. This causes the bleed amount to be increased (FIG. 5(B)). In the next and subsequent cycles, Steps S11→S12→S13 are performed. This causes the flow-in amount to the fuel cell stack to be reduced (FIG. 5(B)), the degree of wetness of the fuel cell to increase and the impedance to decrease (FIG. 5(A)).

The above is repeated.

According to the present embodiment, the bleed valve 210 for regulating the air flow rate is provided in the bleed line 200 branched off from the cathode line 20 on the side upstream of the fuel cell stack 10 and joining the cathode line 20 on the side downstream of the fuel cell stack 10. The compressor 21 is controlled to supply the predetermined amount of air, and the opening of the bleed valve 210 is reduced when it is necessary to reduce the degree of wetness of the fuel cell. By regulating the bleed amount while the amount of air supplied by the compressor 21 is kept constant in this way, the wet state of the fuel cell can be controlled. Specifically, the amount of air supplied to the fuel cell can be increased and decreased without changing power consumption of the compressor 21. Although the degree of wetness of the fuel cell can be reduced to dry the fuel cell also by increasing the rotation speed of the compressor 21, power consumed by the compressor 21 increases if such a technique is employed. Thus, fuel economy is deteriorated. Contrary to this, according to the present embodiment, the dry state can be set without deteriorating fuel economy since the rotation speed of the compressor 21 is constant. Further, since the rotation speed of the compressor 21 does not increase or decrease, operation noise of the compressor 21 does not vary. Thus, the passenger is not caused to feel a sense of discomfort. Therefore, according to the present embodiment, the degree of wetness of the fuel cell can be reduced without causing the passenger to feel a sense of discomfort.

Second Embodiment

Figure 6:
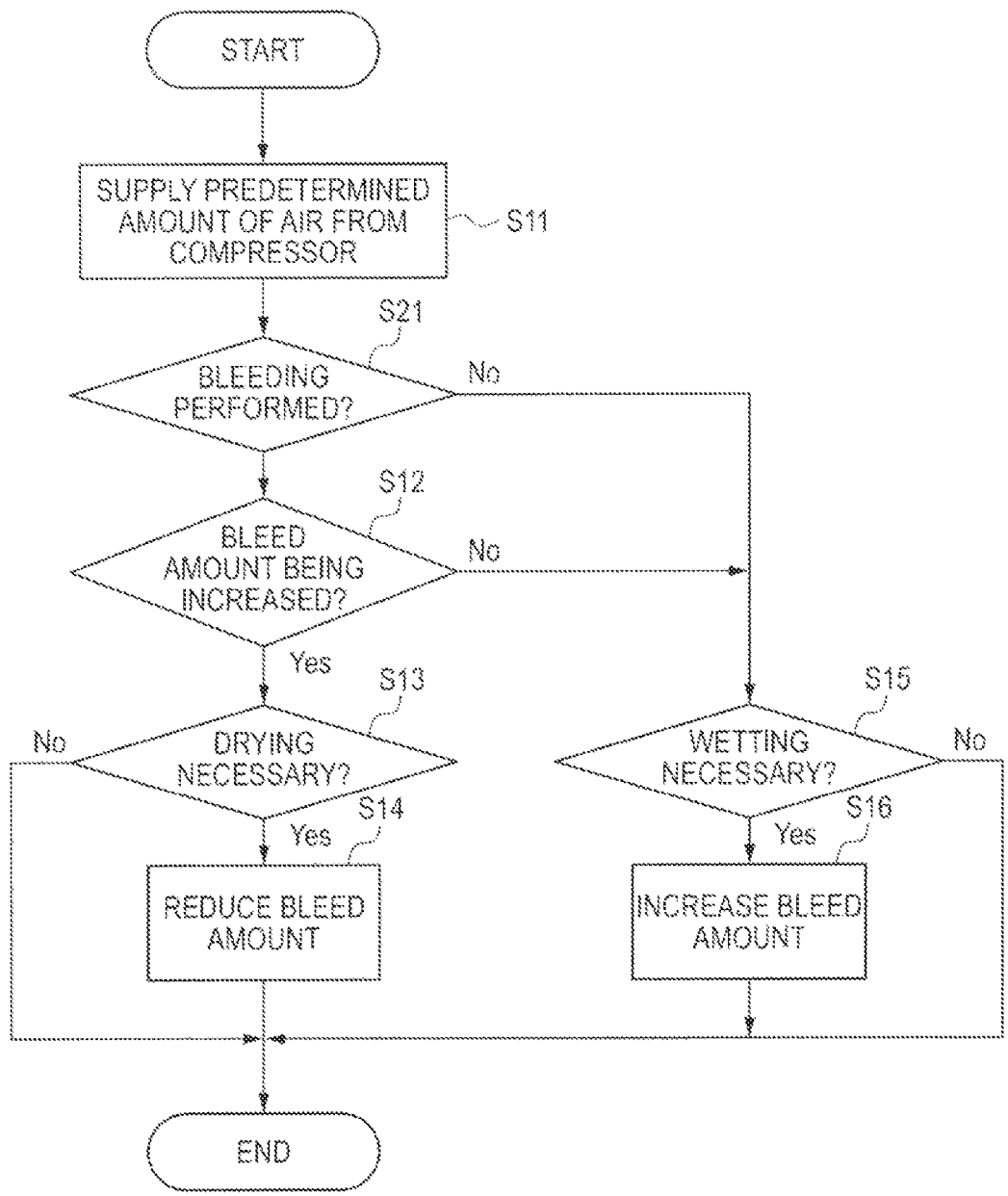
FIG. 6 is a control flow chart executed by a controller of a fuel cell system according to a second embodiment.

FIG. 6 is a control flow chart executed by a controller of a fuel cell system according to a second embodiment. It should be noted that components fulfilling functions similar to the aforementioned ones are denoted by the same reference signs and repeated description is omitted as appropriate below.

In the present embodiment, a control is executed, during an operation in which bleeding is performed (i.e. during an operation in which the opening of the bleed valve is not zero). Specifically, the controller determines whether or not the operation in which bleeding is performed is in execution in Step S21, and shifts a process to Step S12 if the determination result is affirmative while shifting the process to Step S15 if the determination result is negative. If wetting is necessary, the bleed amount can be increased even if bleeding is not currently performed. Thus, such a processing is performed.

It should be noted that operation scenes in which bleeding is performed include scenes in which the required diluted air amount is more than the amount of air to be supplied to the fuel cell stack 10, scenes in which the compressor 21 increases the air amount to avoid a surge, scenes in which the minimum, flow rate is determined by a request of a main body of the compressor and more than the amount of air to be supplied to the fuel cell stack 10 and scenes in which the compressor 21 deliberately increases the air amount.

According to the present embodiment, air discharged without being used can be effectively utilized since the control is executed in such scenes.

Third Embodiment

Figure 7:
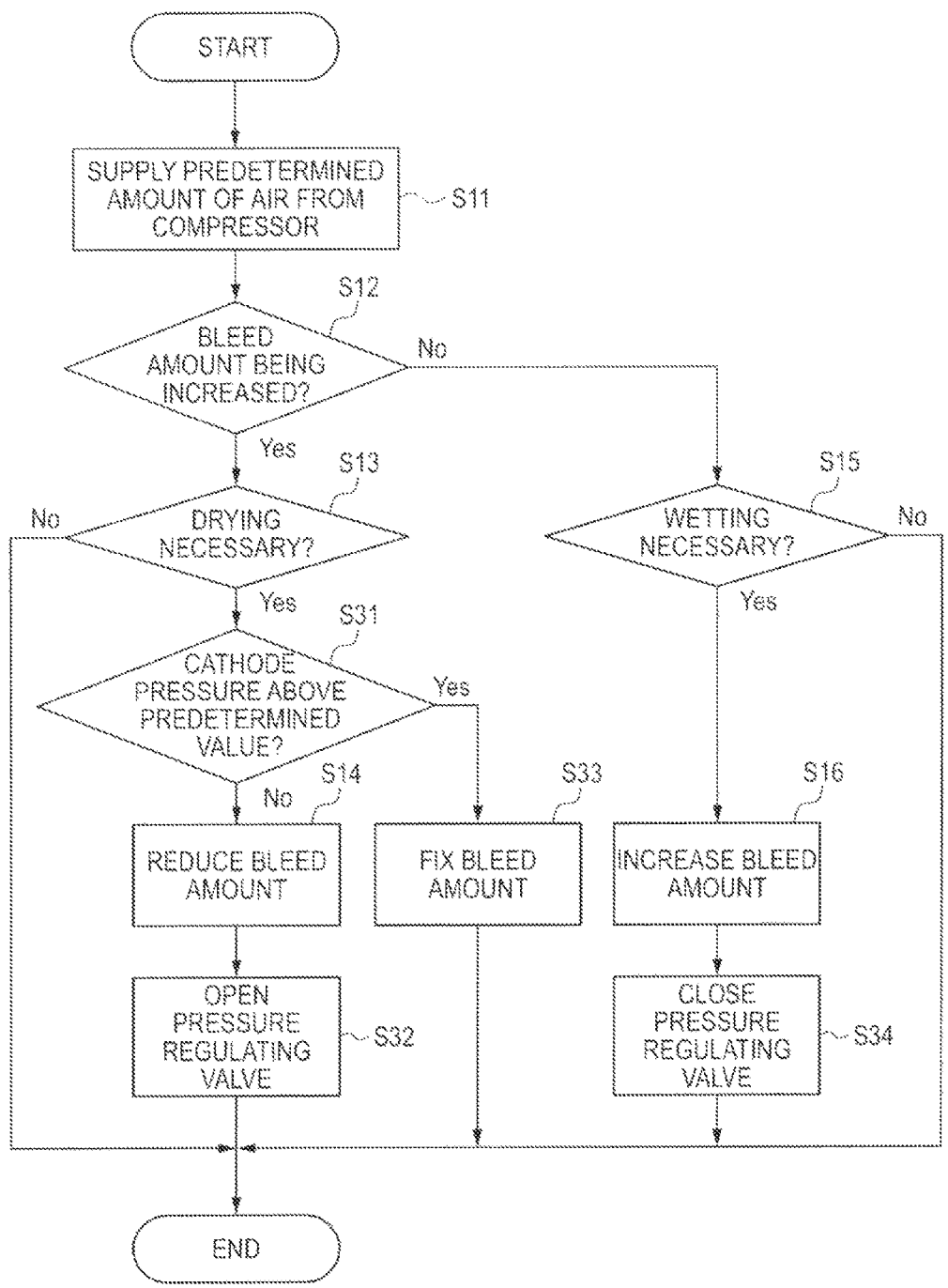
FIG. 7 is a control flow chart executed by a controller of a fuel cell system according to a third embodiment.

FIG. 7 is a control flow chart executed by a controller of a fuel cell system according to a third embodiment.

Even if the bleed amount is reduced and the flow-in amount to the fuel cell stack is increased to reduce the degree of wetness of the fuel cell stack 10 (to dry the fuel cell stack 10), that effect is reduced if the cathode pressure increases. Specifically, this is because a higher cathode pressure rather functions to increase the degree of wetness. Accordingly, in the present invention, the opening of the cathode pressure regulating valve 23 is increased to prevent an increase of the cathode pressure. When the flow-in amount to the fuel cell stack increases even if the cathode pressure regulating valve 23 is fully opened, the bleed amount is fixed by fixing the opening of the bleed valve 210. Specifically, a control is executed as follows. It should be noted that components fulfilling functions similar to the aforementioned ones are denoted by the same reference signs and repeated description is omitted as appropriate.

In Step S31, the controller determines whether or not the cathode pressure is above a reference pressure. This reference pressure is a pressure required to prevent a surge of the compressor 21 or a pressure required to maintain a permissible differential pressure of the reaction gas (cathode gas $O_2$, anode gas $H_2$) on front and back surfaces of the electrolyte membrane. This reference pressure may be set in advance through an experiment. The controller shifts a process to Step S33 if the determination result is affirmative while shifting the process to Step S14 if the determination result is negative.

In Step S32, the controller increases the opening of the cathode pressure regulating valve 23.

In Step S33, the controller fixes the opening of the bleed valve 210.

In Step S34, the controller decreases the opening of the cathode pressure regulating valve 23.

Figure 8:
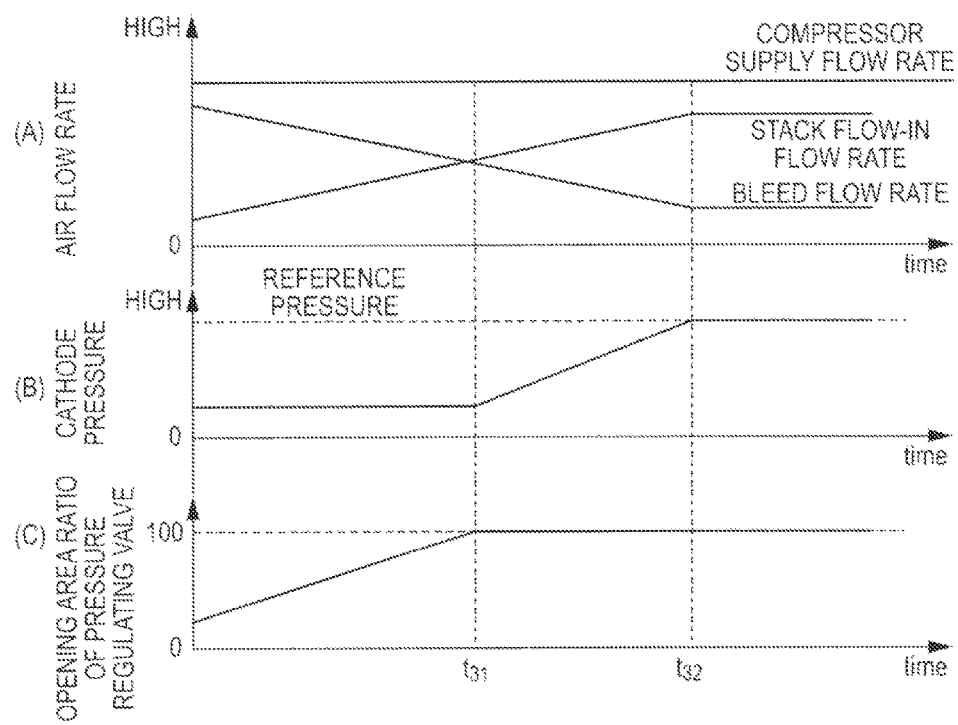
FIG. 8 is a time chart showing an operation when the control flow chart according to the third embodiment is executed.

FIG. 8 is a time chart showing an operation when the control flow chart according to the third embodiment is executed.

At time 0, the flow-in amount to the fuel cell stack, is increased by decreasing fee bleed amount to reduce the degree of wetness of (to dry) the fuel cell stack 10 (FIG. 8(A)). In this state, Steps S11→S12→S13→S31→S14→S32 are repeatedly performed. As a result, the opening of the cathode pressure regulating valve 23 is increased (FIG. 8(C)) and the cathode pressure is maintained constant (FIG. 8(B)).

At time t31, the cathode pressure regulating valve 23 is fully opened (FIG. 8(C)). If there is still a request to reduce the degree of wetness (to dry) the fuel cell stack 10, Steps S11→S12→S13→S31→S14→S32 are repeatedly performed. As a result, the bleed amount is further reduced and the flow-in amount to the fuel, cell stack is increased (FIG. 3(A)). It should be noted, that, since the cathode pressure regulating valve 23 is fully opened, the opening is constant at and after time t31 (FIG. 8(C)).

At time t32, the cathode pressure exceeds the reference pressure (FIG. 8(B)). Accordingly, Steps S11→S12→S13→S31→S33 are performed. This causes the bleed amount to be fixed (FIG. 8(B)).

According to the present embodiment, a surge of the compressor 21 is prevented and the permissible differential pressure of the reaction, gas (cathode gas $O_2$, anode gas $H_2$) on the front and back surfaces of the electrolyte membrane is maintained by the setting of the reference pressure. Further, it can be prevented that power consumed by the compressor 21 is wasted due to an increase of the cathode pressure without reason.

Fourth Embodiment

Figure 9:
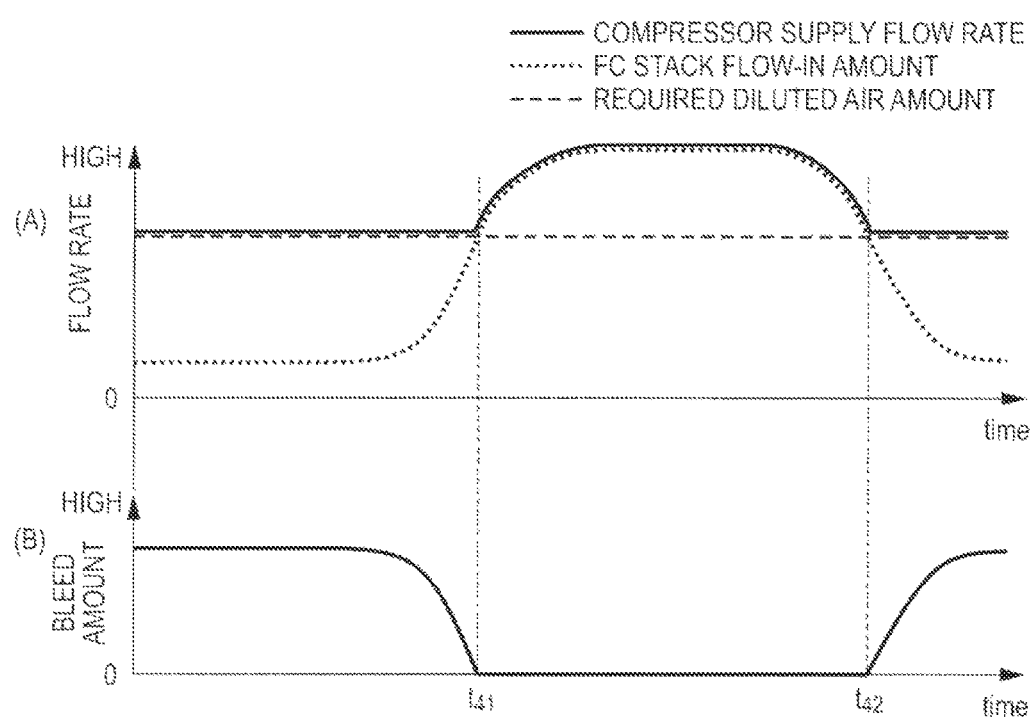
FIG. 9 is a time chart showing an operation when a control according to a fourth embodiment is executed.

FIG. 9 is a time chart showing an operation when a control according to a fourth embodiment is executed.

The flow-in amount to the fuel cell stack is increased by decreasing the bleed, amount to reduce the degree of wetness of (to dry) the fuel cell stack 10. However, the air supply amount of the compressor 21 may be small in the first place. Accordingly, the air supply amount of the compressor 21 is increased in such a case. Then, if it becomes no longer necessary to increase the flow-in amount to the fuel cell stack, the air supply amount of the compressor 21 is first reduced before the opening of the bleed valve 210 is increased. By doing so, the waste of power consumed by the compressor 21 can be prevented. Specifically, the fuel cell system is controlled to operate as follows.

After time t0, the flow-in amount to the fuel cell stack is increased (FIG. 9(A)) by reducing the bleed amount (FIG. 9(B)).

Since the flow-in amount to the fuel cell stack is increased, the bleed valve 210 is fully opened and the bleed amount becomes zero (FIG. 9(B) at time t41 and the air supply amount of the compressor 21 is increased to make up for a shortage (FIG. 9(A)).

If it becomes necessary to reduce the air amount, the air supply amount of the compressor 21 is first reduced (FIG. 9(A)).

At time t42, the air supply amount of the compressor 21 returns to a steady state (FIG. 9(A)) and, thereafter, the bleed amount is regulated (FIG. 9(B)) to regulate the flow-in amount to the fuel cell stack (FIG. 9(A)) by controlling the opening of the bleed valve 210 again.

According to the present embodiment, the waste of power consumed by the compressor 21 can be prevented by such an operation.

Fifth Embodiment

Figure 10:
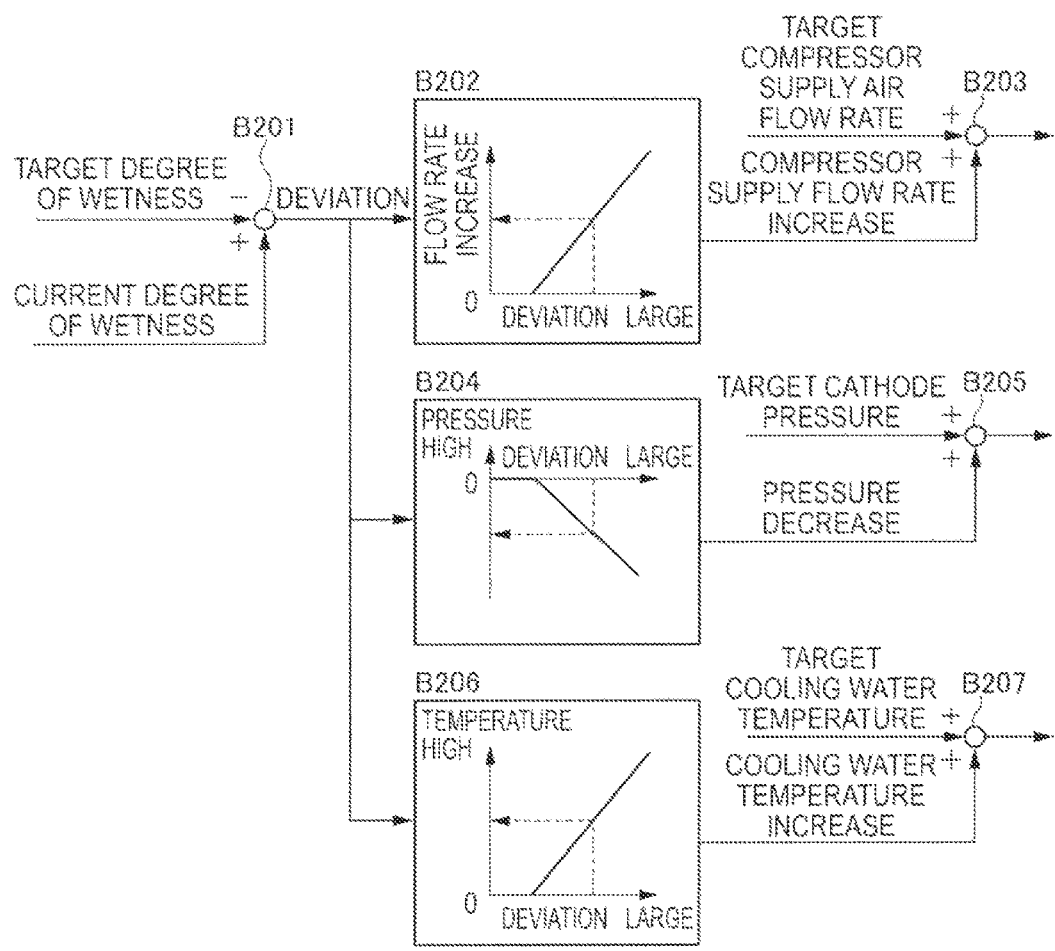
FIG. 10 is a block diagram showing a control function according to a fifth embodiment.

FIG. 10 is a block diagram showing a control function according to a fifth embodiment.

In each of the above embodiments, the bleed amount is regulated to regulate the flow-in amount to the fuel cell stack by controlling the opening of the bleed valve 210 when it is desired to change the wet state of the fuel cell stack.

However, it is sometimes desired to more quickly change the wet state of the fuel cell stack.

For example, it is sometimes desired to dry the fuel cell stack by quickly reducing the degree of wetness of the fuel cell stack. In such a case, if the air supply amount by the compressor 21 is increased, the cathode pressure regulating valve 23 is opened to reduce the cathode pressure and the cooling water temperature is increased, the degree of wetness of the fuel cell stack can be quickly reduced. Accordingly, in the present embodiment, specific control contents to realize this are described.

A block B201 subtracts a target degree of wetness from a current degree of wetness. A larger deviation is output as a degree of drying with respect to the current degree of wetness increases.

A block B202 calculates a flow rate increase of the compressor 21 by applying the deviation output from, the block B201 to a map set in advance.

A block B203 corrects a target supply amount of the compressor 21 by adding the flow rate increase output from the block B202 to the target supply amount of the compressor 21. Then, the compressor 21 is controlled to realize that target supply amount.

A block B204 calculates a cathode pressure decrease by applying the deviation output from the block B201 to a map set in advance.

A block B205 corrects a target cathode pressure by adding the pressure decrease output from the block B204 to the target cathode pressure. Then, the cathode pressure regulating valve 23 is controlled to realize that target cathode pressure.

A block B206 calculates a temperature increase of the cooling water by applying the deviation output from the block B201 to a map set in advance.

A block B207 corrects a target cooling water temperature by adding the temperature increase output from the block B206 to the target cooling water temperature. Then, the cooling fan 410 and the three-way valve 42 are controlled to realize that target cooling water temperature.

According to the present embodiment, the degree of wetness of the fuel cell stack can be quickly changed by doing so.

Although the embodiments of the present invention have been described above, the above embodiments are merely an illustration of some application examples of the present invention and not of the nature to limit the technical scope of the present invention to the specific configurations of the above embodiments.

For example, in the above description, the flow rate of the cathode gas a flowing in the bleed line 200 is detected by the bleed flow rate sensor 203. However, there is no limitation to this. For example, a flow rate sensor is provided upstream of a part of the bleed line 200 branched off from the cathode line 20 and a flow rate sensor is provided also downstream of that part. A difference between amounts detected, by two flow rate sensors may be set as the flow rate of the cathode gas $O_2$ flowing in the bleed line 200.

Note that the above embodiments can be appropriately combined.

The present application claims a priority of Japanese Patent Application No. 2012-287516 filed with the Japan Patent Office on Dec. 28, 2012, all the contents of which are hereby incorporated by reference.

The invention claimed is:

1. A fuel cell system, comprising:
    a fuel cell;
    an air supplier;
    an air passage connected to the fuel cell, air supplied from the air supplier flowing in the air passage;
    a bleed passage branched off from the air passage on a side upstream of the fuel cell and joining the air passage on a side downstream of the fuel cell, part of the air supplied by the air supplier flowing in the bleed passage in such a manner as to circumvent the fuel cell;
    a bleed valve provided in the bleed passage, the bleed valve regulating the amount of air flowing in the bleed passage;
    and
    a controller programmed to
        control the air supplier and the bleed value,
        control the air supplier to supply a predetermined amount of air,
        determine whether or not it is necessary to reduce a degree of wetness of the fuel cell, and
        reduce an opening of the bleed valve without increasing or decreasing of a rotation speed of the air supplier when it is determined that the degree of wetness of the fuel cell needs to be reduced.

2. The fuel cell system according to claim 1, wherein:
    the controller is programmed to determine whether or not the bleed valve is currently closed, and reduce the opening of the bleed valve when it is determined that the degree of wetness of the fuel cell needs to be reduced and the bleed valve is not currently closed.

3. The fuel cell system according to claim 1, wherein:
    the controller is programmed to determine that it is necessary to reduce the degree of wetness of the fuel cell when at least one of the following conditions is satisfied:
    a high-frequency impedance is smaller than a predetermined value,
    a predetermined time has not elapsed after startup,
    a predetermined time has not elapsed after a warm-up operation, or
    a predetermined time has not elapsed after a return from an idle stop state and an operation is stopped.

4. The fuel cell system according to claim 1, wherein the controller is programmed to determine whether or not it is necessary to increase the degree of wetness of the fuel cell, and increase the opening of the bleed valve when it is determined that the degree of wetness of the fuel cell needs to be increased.

5. The fuel cell system according to claim 4, wherein:
    the controller is programmed to determine that it is necessary to increase the degree of wetness of the fuel cell when at least one of the following conditions is satisfied:
    a high-frequency impedance is larger than a predetermined value,
    a predetermined time has elapsed after startup, or
    a predetermined time has elapsed after a warm-up operation and a predetermined time has elapsed after a return from an idle stop state.

6. The fuel cell system according to claim 1, further comprising:
    a pressure regulating valve provided in the air passage on the side downstream of the fuel cell, the pressure regulating valve regulating an air pressure,
    wherein the controller is programmed to increase an opening of the pressure regulating valve as the controller reduces the opening of the bleed valve.

7. The fuel cell system according to claim 6, wherein:
    the controller is programmed to keep the opening of the bleed valve constant when the air pressure exceeds a predetermined pressure even if the controller increases the opening of the pressure regulating valve.

8. The fuel cell system according to claim 1, wherein:
    the controller is programmed to control the air supplier to increase the amount of air when the amount of air passing through the bleed valve is smaller than a predetermined value.

9. The fuel cell system according to claim 8, wherein:
the controller is programmed to control the air supplier to reduce the amount of air when the amount of air is increased and it is determined that the degree of wetness of the fuel cell needs to be increased.

10. The fuel cell system according to claim 9, wherein:
the controller is programmed to increase the opening of the bleed valve when the amount of the air supplied by the air supplier becomes less than a predetermined amount.

11. The fuel cell system according to claim 1, wherein:
the controller is programmed to control the air supplier to increase the amount of air when it is determined that the degree of wetness of the fuel cell needs to be reduced.

12. The fuel cell system according to claim 1, wherein:
the controller is programmed to increase the temperature of cooling water of the fuel cell when it is determined that the degree of wetness of the fuel cell needs to be reduced.

* * * * *